United States Patent [19]

Smith

[11] 4,041,599

[45] Aug. 16, 1977

[54] METHOD OF CONCENTRIC BONDING OF A ROD IN A TUBULAR SHAFT

[75] Inventor: Derek Reginald Smith, Bristol, England

[73] Assignee: Union Carbide Corporation, New York, N.Y.

[21] Appl. No.: 676,866

[22] Filed: Apr. 14, 1976

[51] Int. Cl.² .............................................. B23P 11/02
[52] U.S. Cl. ........................................ 29/451; 29/458; 29/469.5; 156/295; 403/268
[58] Field of Search ................. 29/450, 451, 458, 460, 29/469.5; 403/265, 268; 156/294, 295

[56] References Cited

U.S. PATENT DOCUMENTS

| | | | |
|---|---|---|---|
| 1,877,352 | 9/1932 | Megow | 403/268 X |
| 3,208,136 | 9/1965 | Joslin | 29/458 |
| 3,388,211 | 6/1968 | Nichols et al. | 29/458 X |
| 3,498,866 | 3/1970 | Kilbane | 156/294 X |
| 3,785,025 | 1/1975 | Wolf | 156/295 X |
| 3,828,412 | 8/1974 | Dreksler | 29/458 X |
| 3,846,206 | 11/1974 | Busma, Jr. et al. | 156/295 X |
| 3,907,446 | 9/1975 | Leslie | 403/268 |
| 3,938,234 | 2/1976 | Price | 156/295 X |

FOREIGN PATENT DOCUMENTS

| | | | |
|---|---|---|---|
| 1,114,386 | 4/1956 | France | 403/268 |
| 2,509,357 | 9/1975 | Germany | 403/265 |
| 1,093,488 | 12/1967 | United Kingdom | 403/268 |
| 1,018,530 | 1/1966 | United Kingdom | 29/458 |

*Primary Examiner*—Charlie T. Moon
*Attorney, Agent, or Firm*—John S. Piscitello

[57] ABSTRACT

A method of accurately centering and securely bonding a rod in a tubular shaft. Concentric alignment of the rod in the shaft is assured by positioning two resilient sealing rings between the rod and the shaft which act to center and hold the rod in proper geometric relationship with the shaft. While the invention is generally useful wherever secure bonding of a male fitting in a tubular shaft is desired, it is particularly applicable where accurate centering of the fitting in the shaft is necessary, such as in the bonding of a universal joint fitting in a drive shaft.

24 Claims, 2 Drawing Figures

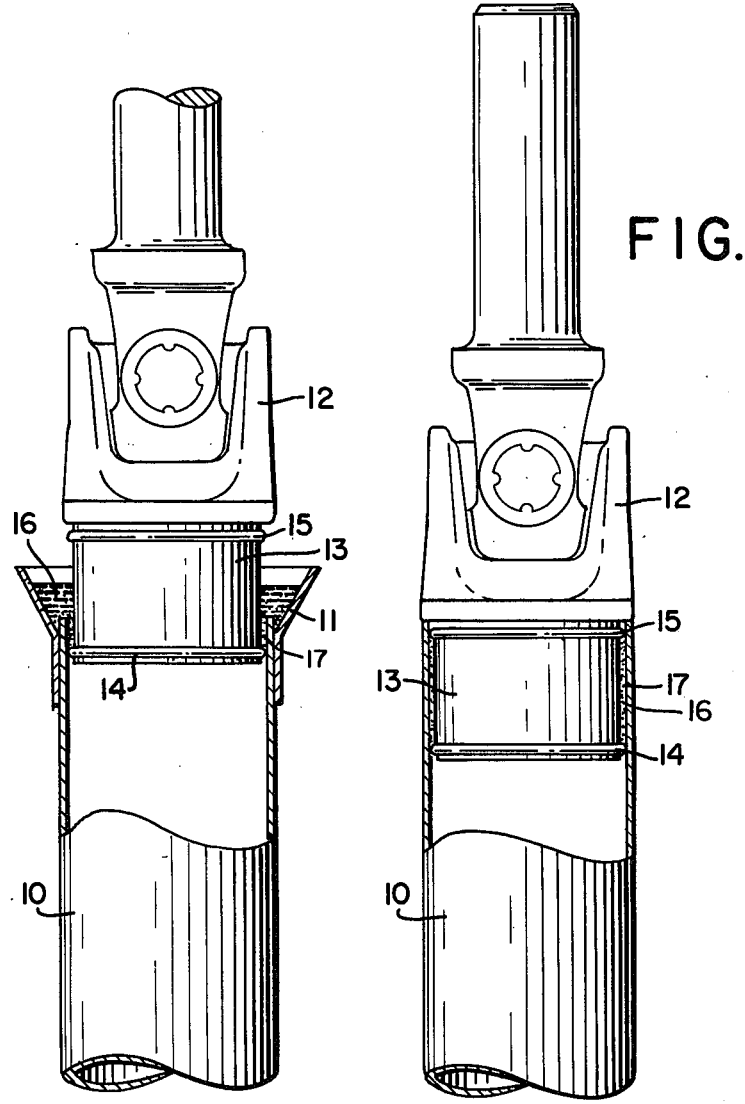

METHOD OF CONCENTRIC BONDING OF A ROD IN A TUBULAR SHAFT

BACKGROUND OF THE INVENTION

This invention relates to a method of bonding a rod concentrically in a tubular shaft.

One obvious method of securing a rod in a tubular shaft is to coat the rod and/or the inner circumference of the shaft with a suitable cement or bonding agent, and then insert the rod in the shaft. However, this method suffers from the disadvantage that the bonding agent employed tends to rub off the rod when the rod is inserted into the shaft if too tight a fit is provided, or, alternatively, is accompanied by leakage of the bonding agent from the annular space between the rod and the shaft if the fit is too loose. In any event, the end result is a loss of bonding agent and a weakening of the joint, so that the desired degree of bonding is not attained. Furthermore, in certain instances, as in the case of the bonding of a universal joint fitting in a drive shaft, it is essential that the fitting be aligned concentrically in the shaft, and this method does not provide for obtaining a secure joint having such concentric alignment.

Another method of bonding a rod in a tubular shaft that has been proposed is to first insert the rod into the shaft, and then inject the bonding agent into the annular space between the rod and the shaft from a hole in the side of the shaft. A second hole in the side of the shaft is also necesssary in such case, of course, to allow for the release of air displaced by the bonding agent. However, not only is this technique quite slow, but oftentimes it fails to completely fill the annular space between the rod and the shaft with bonding agent, resulting in voids between them and a poor bond. Visual inspection of the joint, of course, is not possible, so that the presence of such voids, and the resulting poor bond, goes undetected.

SUMMARY OF THE INVENTION

The present invention provides an improved method for economically and securely bonding a rod concentrically in a tubular shaft which comprises: (1) fitting a pair of parallel annular grooves positioned near the base and top of the mating portion of the rod with a pair of resilient sealing rings having inner diameters such that they are retained in place by the grooves and outer diameters greater than that of the mating portion, said sealing rings being designed to fit snugly into the tubular shaft and form a tight fit between the mating portion and the shaft; (2) inserting the base of the mating portion containing the first of said resilient sealing rings into one end of the tubular shaft so as to compress said resilient sealing ring snugly between the mating portion and the inner circumference of that end of said tubular shaft, said end of said tubular shaft having the neck of a funnel tightly fitted about its outer circumference; (3) filling the funnel with a suitable liquid bonding agent; (4) further inserting the mating portion of the rod into the tubular shaft, thereby creating a vacuum in the annular spacing between said mating portion and said tubular shaft so as to cause the bonding agent in the funnel to flow into and fill said annular spacing; and (5) continuing to insert the mating portion of the rod into the tubular shaft until the annular space between said mating portion and said tubular shaft has been completely filled with bonding agent and the second resilient sealing ring at the top of the mating portion has been forced into the shaft and snugly compressed between said mating portion and said tubular shaft, thereby entrapping and sealing said bonding agent in said annular space, and (6) curing said bonding agent to the thermoset state so as to bond the shaft and the mating portion of the rod together in concentric alignment.

BRIEF DESCRIPTION OF THE DRAWING

FIG. 1a is a partial cutaway elevation view showing the assembly of a universal joint and tubular drive shaft just prior to the concentric insertion and bonding of the mating section of the universal joint into the tubular drive shaft in accordance with the present invention.

FIG. 1b is a partial cutaway elevation view showing the universal joint and tubular drive shaft of FIG. 1a after the mating section of the universal joint has been concentrically aligned in and bonded to the tubular drive shaft. The funnel shown in the assembly of FIG. 1a has been removed in FIG. 1b.

DETAILED DESCRIPTION OF THE INVENTION

The present invention provides a method of accurately centering and securely bonding a rod in a tubular shaft. Concentric alignment of the rod in the shaft is assured by the positioning of two resilient sealing rings between the rod and the shaft which act to center and hold the rod in proper geometric relationship with the shaft. These two sealing rings are also instrumental in providing a firm bond between the rod and the shaft by ensuring, first, that the annular space between the rod and the shaft is completely filled with bonding agent, and, secondly, in preventing leakage of the bonding agent after it has entered and filled said annular space. Thus, the seal at the base of the mating portion of the rod functions first to create the suction which draws the bonding agent into the annular space between the rod and the shaft, and then, along with the second sealing ring at the top of the mating portion, acts to prevent leakage of the bonding agent after it has entered and filled this annular space. While the invention is generally useful whenever secure bonding of a male fitting in a tubular shaft is desired, it is particularly applicable where accurate centering of the fitting in the shaft is necessary, such as in the bonding of a universal joint fitting in a drive shaft.

Referring now to the drawings, one end of a tubular carbon fiber-reinforced epoxy drive shaft 10, having an inner diameter of 2.540 inches, is tightly fitted about its circumference with the neck of a funnel 11. Universal joint 12, having a mating section 13, is provided with a first rubber sealing ring 14 near the base of the mating section and with a second rubber sealing ring 15 near the top of the mating section. Rings 14 and 15 have inner diameters such that they are retained in place by means of parallel annular grooves in mating section 13 (not shown) spaced 1.5 inches apart. Both rings 14 and 15 have outer diameters slightly greater than that of mating section 13 and are designed to fit snugly into shaft 10 and form a tight fit between mating section 13 and shaft 10 when inserted therein. Mating section 13 has a diameter of 2.500 inches and is 1.75 inches long.

When mating section 13 of universal joint 12 is inserted through the wider portion of funnel 11 into shaft 10, rubber sealing ring 14 is compressed so that it fits snugly between mating section 13 and tube 10. Funnel 11 is then filled with liquid bonding agent 16, and mating section 13 of universal joint 12 is further forced into shaft 10, creating a vacuum in annular space 17 between mating section 13 and shaft 10, which causes liquid bonding agent 16 in funnel 11 to flow into and fill this annular spacing. Finally, upper sealing ring 15 is forced into place between mating section 13 and shaft 10, and the flow of further bonding agent from funnel 11 is cut off. Annular space 17 is now completely filled with bonding agent 16, while sealing rings 14 and 15, fitted tightly between mating section 13 and shaft 10, prevent leakage or escape of this bonding agent from the annular spacing.

In order to ensure the free flow of bonding agent 16 from funnel 11 into annular space 17, and facilitate insertion of mating section 13 into shaft 10, it is preferred to coat mating section 13 and the upper inner surface of shaft 10 (the portion which is to be in contact with mating section 13) with the bonding agent before inserting mating section 13 in shaft 10. To secure a better bond between mating section 13 and shaft 10, it is also preferred that the surface of mating section 13 and the upper inner surface of shaft 10 (the portion which is to be in contact with mating section 13) be abraded.

After bonding agent 16 has completely filled annular space 17 and is entrapped therein by means of sealing rings 14 and 15, funnel 11 may be removed from shaft 10 and any excess bonding agent on the exterior of shaft 10 may be wiped away. The bonding agent in annular space 17 is then cured, thereby completing the process. If desired, a similar attachment may be made at the other end of the shaft. In such case, a hole should first be made in the mating portion of said attachment to allow for the escape of air when said mating portion is inserted into the shaft.

In order to ensure concentric alignment and proper bonding of the rod into the shaft, the total radial space between the rod and the shaft should be between 0.010 inches to 0.060 inches, i.e., the outer diameter of the rod and the inner diameter of the shaft should not vary by more than from 0.010 inches to 0.060 inches. Most preferably, a total spacing of 0.040 inches is provided between the rod and the shaft so that when the rod is concentrically aligned in the shaft there is a spacing of 0.020 inches at all points between the rod and the shaft.

Any low viscosity liquid bonding agent capable of adhering to both the male fitting and the tubular shaft can be employed in the process of the present invention, provided that such bonding agent does not give off volatiles on curing. An epoxy resin binder system is preferred because of its ability to adhere to a widespread number of materials and its good bonding characteristics. Such system comprises an epoxy resin together with a reactive resin hardener and/or an epoxy polymerization catalyst in an amount conventionally used in the art to cure epoxy resins.

The following example is set forth for purposes of illustration so that those skilled in the art may better understand this invention. It should be understood that it is exemplary only, and should not be construed as limiting this invention in any manner.

EXAMPLE 1

One end of a tubular carbon fiber-reinforced epoxy drive shaft, having an inner diameter of 2.540 inches, was tightly fitted into the neck of a funnel. The mating section of a universal joint, having a diameter of 2.500 inches and a length of 1.75 inches, was fitted with a pair of rubber O-rings near the top and base of the mating section. The rings had inner diameters such that they were retained in place by means of parallel annular grooves in the mating section positioned 1.5 inches apart. The outer diameters of the rings were slightly greater than that of the mating section and were designed to fit snugly into the drive shaft and form a tight fit between the shaft and the mating section when inserted therein. The base of the mating section of the universal joint was then inserted vertically through the wider portion of the funnel into the drive shaft until the lower sealing ring fitted snugly into the top of the shaft. The funnel was then filled with an epoxy resin binder system composed of 100 parts by weight of a commercially available liquid epoxy resin produced by the reaction of epichlorohydrin and 2,2-bis(4-hydroxyphenyl)-propane (Epikote 828, manufactured by Shell Chemicals UK Ltd.) and 50 parts by weight of a polyamide epoxy resin hardener (Ancamide 400, manufactured by Anchor Chemical Co. Ltd.). This binder system was also used to coat the mating section of the universal joint and the upper inner surface of the drive shaft (the portion which was to be in contact with the mating section) before the mating section was inserted into the drive shaft. When the funnel was filled, the mating section of the universal joint was then further forced into the shaft, thereby creating a vacuum in the annular space between the mating section and the shaft and causing the epoxy resin binder in the funnel to flow into and fill the annular space. Finally, the upper O-ring on the mating section was pressed snugly into the shaft, and the flow of bonding agent from the funnel was cut off.

The funnel was then removed from the drive shaft, the exterior of the shaft was wiped free of resin, and the bonding agent which filled and was entrapped in the annular space between the shaft and the mating section of the universal joint by the two rubber O-rings was allowed to cure at room temperature for 24 hours. At the end of this time, a second universal joint was attached to the other end of the shaft in like manner. The mating section of the second universal joint contained an air bleed hole positioned in its axis to allow air to escape when it was pushed into place in the shaft. After the second universal joint was attached, the assembly was given a further 24 hour cure at room temperature, and was then post cured by heating at 80° C. for 4 hours.

The drive shaft-universal joint assembly made in this manner was subjected to a torsional load of 500 lb.ft., so as to simulate the maximum load experienced by an automotive drive shaft. The load was applied and released at a rate of 120 cyles/minute for a total of 106 cycles without failure of bond.

What is claimed is:

1. A process for securely bonding a rod concentrically in a tubular shaft which comprises: (1) fitting a pair of parallel annular grooves positioned near the base and top of the mating portion of the rod with a pair of resilient sealing rings having inner diameters such that they are retained in place by the grooves and outer diameters greater than that of the mating portion, said sealing rings being designed to fit snugly into the tubular shaft and form a tight fit between the mating portion and the shaft; (2) inserting the base of the mating portion containing the first of said resilient sealing rings into one end of the tubular shaft so as to compress said resilient sealing ring snugly between the mating portion and the inner circumference of that end of said tubular shaft, said end of said tubular shaft having the neck of a funnel tightly fitted about its outer circumference; (3)

filling the funnel with a suitable liquid bonding agent; (4) further inserting the mating portion of the rod into the tubular shaft, thereby creating a vacuum in the annular spacing between said mating portion and said tubular shaft so as to cause the bonding agent in the funnel to flow into and fill said annular spacing; (5) continuing to insert the mating portion of the rod into the tubular shaft until the annular space between said mating portion and said tubular shaft has been completely filled with bonding agent and the second resilient sealing ring at the top of the mating portion has been forced into the shaft and snugly compressed between said mating portion and said tubular shaft, thereby entrapping and sealing said bonding agent in said annular space; and (6) curing said bonding agent to the thermoset state so as to bond the shaft and the mating portion of the rod together in concentric alignment.

2. A process as in claim 1 wherein the mating portion of the rod and the upper inner surface of the tubular shaft which is to be in contact with said mating portion is coated with the bonding agent before the mating portion is inserted into the shaft.

3. A process as in claim 2 wherein the surface of the mating portion of the rod and the upper inner surface of the tubular shaft are abraded.

4. A process as in claim 1 whereby a universal joint fitting is bonded concentrically in a tubular drive shaft.

5. A process as in claim 4 wherein the mating portion of the universal joint fitting and the upper inner surface of the tubular drive shaft which is to be in contact with said mating portion is coated with the bonding agent before the mating portion is inserted into the shaft.

6. A process as in claim 5 wherein the surface of the mating portion of the universal joint fitting and the upper inner surface of the tubular drive shaft are abraded.

7. A process as in claim 1 wherein an epoxy resin binder system is employed as the bonding agent.

8. A process as in claim 7 wherein the mating portion of the rod and the upper inner surface of the tubular shaft which is to be in contact with said mating portion is coated with the bonding agent before the mating portion is inserted into the shaft.

9. A process as in claim 8 wherein the surface of the mating portion of the rod and the upper inner surface of the tubular shaft are abraded.

10. A process as in claim 7 wherein the total radial space between the rod and the shaft is between 0.010 inches and 0.060 inches.

11. A process as in claim 10 wherein the mating portion of the rod and the upper inner surface of the tubular shaft which is to be in contact with said mating portion is coated with the bonding agent before the mating portion is inserted into the shaft.

12. A process as in claim 11 wherein the surface of the mating portion of the rod and the upper inner surface of the tubular shaft are abraded.

13. A process as in claim 1 wherein the resilient sealing rings on the mating portion of the rod are rubber O-rings.

14. A process as in claim 13 wherein the mating portion of the rod and the upper inner surface of the tubular shaft which is to be in contact with said mating portion is coated with the bonding agent before the mating portion is inserted into the shaft.

15. A process as in claim 14 wherein the surface of the mating portion of the rod and the upper inner surface of the tubular shaft are abraded.

16. A process as in claim 13 wherein an epoxy resin binder system is employed as the bonding agent.

17. A process as in claim 16 wherein the mating portion of the rod and the upper inner surface of the tubular shaft which is to be in contact with said mating portion is coated with the bonding agent before the mating portion is inserted into the shaft.

18. A process as in claim 17 wherein the surface of the mating portion of the rod and the upper inner surface of the tubular shaft are abraded.

19. A process as in claim 16 wherein the total radial space between the rod and the shaft is between 0.010 inches and 0.060 inches.

20. A process as in claim 19 wherein the mating portion of the rod and the upper inner surface of the tubular shaft which is to be in contact with said mating portion is coated with the bonding agent before the mating portion is inserted into the shaft.

21. A process as in claim 20 wherein the surface of the mating portion of the rod and the upper inner surface of the tubular shaft are abraded.

22. A process as in claim 19 whereby a universal joint fitting is bonded concentrically in a tubular drive shaft.

23. A process as in claim 22 wherein the mating portion of the universal joint fitting and the upper inner surface of the tubular drive shaft which is to be in contact with said mating portion is coated with the bonding agent before the mating portion is inserted into the shaft.

24. A process as in claim 23 wherein the surface of the mating portion of the universal joint fitting and the upper inner surface of the tubular drive shaft are abraded.

* * * * *